(12) United States Patent
Alexander et al.

(10) Patent No.: US 11,434,068 B2
(45) Date of Patent: Sep. 6, 2022

(54) FLAME RESISTANT FILTER APPARATUS AND METHOD

(71) Applicant: Restaurant Technologies, Inc., Mendota Heights, MN (US)

(72) Inventors: Glenn David Alexander, Dunedin (NZ); Joseph Anthony Salpietra, Shreveport, LA (US); Jordan Salpietra, Dallas, TX (US)

(73) Assignee: RESTAURANT TECHNOLOGIES, INC., Mendota Heights, MN (US)

( * ) Notice: Subject to any disclaimer, the term of this patent is extended or adjusted under 35 U.S.C. 154(b) by 68 days.

(21) Appl. No.: 16/879,523

(22) Filed: May 20, 2020

(65) Prior Publication Data
US 2020/0277134 A1    Sep. 3, 2020

Related U.S. Application Data

(63) Continuation-in-part of application No. 16/236,727, filed on Dec. 31, 2018, now abandoned, which is a
(Continued)

(51) Int. Cl.
*B65D 88/74*     (2006.01)
*B01D 39/16*    (2006.01)
(Continued)

(52) U.S. Cl.
CPC ......... *B65D 88/741* (2013.01); *B01D 39/163* (2013.01); *B01D 39/1615* (2013.01);
(Continued)

(58) Field of Classification Search
CPC   B65D 88/741; B01D 39/1615; B01D 39/163; B01D 2239/064; B01D 2239/08;
(Continued)

(56) References Cited

U.S. PATENT DOCUMENTS 1,757,690 A    5/1930  Strindberg
2,332,519 A   10/1943  Leonardson et al.
(Continued)

FOREIGN PATENT DOCUMENTS

CA    1280699    2/1991
CA    2262821    2/1998
(Continued)

OTHER PUBLICATIONS

Notification of Transmittal of the International Search Report and the Written Opinion of the International Searching Authority, or the Declaration of International Application No. PCT/US2009/058183, dated Feb. 5, 2010.
(Continued)

*Primary Examiner* — Christopher P Jones
*Assistant Examiner* — Brit E. Anbacht
(74) *Attorney, Agent, or Firm* — Baker Botts, LLP

(57) ABSTRACT

A filter pad with a dry loft between approximately 0.15 and 0.5 inches includes at least a first fiber web comprising a plurality of oleophilic fibers, wherein the oleophilic fibers: have a linear density between approximately 2 and 9 denier; have a length between approximately 1 and 4 inches; and have been uploaded with flame resistant particles.

10 Claims, 3 Drawing Sheets

Related U.S. Application Data continuation of application No. 12/565,592, filed on Sep. 23, 2009, now Pat. No. 10,167,137, which is a continuation of application No. 12/430,650, filed on Apr. 27, 2009, now Pat. No. 8,277,530.

(60) Provisional application No. 61/099,688, filed on Sep. 24, 2008, provisional application No. 61/099,699, filed on Sep. 24, 2008.

(51) Int. Cl.
  *D04H 1/488* (2012.01)
  *D04H 1/4382* (2012.01)
  *D04H 1/4258* (2012.01)

(52) U.S. Cl.
  CPC ......... *D04H 1/4258* (2013.01); *D04H 1/4382* (2013.01); *D04H 1/488* (2013.01); *B01D 2239/064* (2013.01); *B01D 2239/08* (2013.01); *Y10T 156/10* (2015.01)

(58) Field of Classification Search
  CPC .... D04H 1/4258; D04H 1/4382; D04H 1/488; Y10T 156/10
  USPC ........................................................ 55/495
  See application file for complete search history.

(56) References Cited

U.S. PATENT DOCUMENTS

| | | |
|---|---|---|
| 2,664,172 A | 12/1953 | Butterfield |
| 2,809,715 A | 10/1957 | Lemkey |
| 2,978,064 A | 4/1961 | Deaver |
| 3,015,367 A | 1/1962 | Smith et al. |
| 3,158,532 A | 11/1964 | Pall et al. |
| 3,388,536 A | 6/1968 | Nash |
| 3,566,585 A | 7/1969 | Voloshen et al. |
| 3,660,969 A | 5/1972 | Fox |
| 3,683,919 A | 8/1972 | Ells |
| 3,707,385 A | 12/1972 | Kraemer et al. |
| 3,865,193 A | 2/1975 | Hall |
| 3,877,974 A * | 4/1975 | Mischutin ............ D06M 13/21 442/146 |
| 3,925,137 A | 12/1975 | Kamei |
| 3,945,812 A | 3/1976 | Doane |
| 4,105,423 A | 8/1978 | Latakas et al. |
| 4,277,267 A | 7/1981 | Posner |
| 4,336,038 A | 6/1982 | Schultheiss et al. |
| 4,350,504 A | 9/1982 | Diachuk |
| 4,368,058 A | 1/1983 | Crowley et al. |
| 4,403,446 A | 9/1983 | Wolfe et al. |
| 4,433,020 A | 2/1984 | Narukawa et al. |
| 4,455,237 A | 6/1984 | Kinsley et al. |
| 4,517,308 A | 5/1985 | Ehlenz et al. |
| 4,658,755 A | 4/1987 | Bernard et al. |
| 4,689,058 A | 8/1987 | Vogt et al. |
| 4,854,949 A | 8/1989 | Giles, Sr. et al. |
| 4,883,507 A | 11/1989 | Rey et al. |
| 4,938,234 A | 7/1990 | Capriotti |
| 4,955,995 A | 9/1990 | Pontius |
| 5,187,006 A | 2/1993 | Leighton et al. |
| 5,273,565 A | 12/1993 | Milligan et al. |
| 5,417,752 A | 5/1995 | Paren et al. |
| 5,470,365 A | 11/1995 | Jang |
| 5,512,073 A | 4/1996 | Mirza et al. |
| 5,635,005 A | 6/1997 | Saitoh et al. |
| 5,707,411 A | 1/1998 | Rodaway et al. |
| 5,935,303 A | 8/1999 | Kimura |
| 5,972,091 A | 10/1999 | Giesfeldt et al. |
| 6,099,901 A | 8/2000 | Cronia et al. |
| 6,110,260 A | 8/2000 | Kubokawa |
| 6,293,983 B1 | 9/2001 | More |
| 6,389,832 B1 | 5/2002 | Wu |
| 6,468,323 B1 | 10/2002 | Chwala |
| 6,918,940 B1 | 7/2005 | Lackey et al. |
| 7,338,702 B2 | 3/2008 | Swales et al. |
| 7,465,332 B2 | 12/2008 | Randinelli |
| 8,277,530 B2 | 10/2012 | Alexander et al. |
| 8,652,241 B2 | 2/2014 | Alexander et al. |
| 9,242,200 B2 | 1/2016 | Alexander et al. |
| 10,167,137 B2 | 1/2019 | Alexander et al. |
| 10,300,422 B2 | 5/2019 | Alexander et al. |
| 2002/0046656 A1* | 4/2002 | Benson ................ D01F 6/90 95/287 |
| 2003/0017129 A1 | 1/2003 | Maleeny et al. |
| 2003/0205039 A1 | 11/2003 | Terlson |
| 2004/0083896 A1 | 5/2004 | Mihaylov et al. |
| 2004/0096629 A1 | 5/2004 | Aneja et al. |
| 2004/0116026 A1 | 6/2004 | Kubose et al. |
| 2004/0116028 A1 | 6/2004 | Bryner |
| 2004/0121114 A1 | 6/2004 | Piana et al. |
| 2004/0139858 A1 | 7/2004 | Entezarian et al. |
| 2004/0177598 A1 | 9/2004 | Bohacik |
| 2004/0211163 A1* | 10/2004 | Faulkner ................ B32B 5/02 55/486 |
| 2005/0028498 A1 | 2/2005 | Entezarian et al. |
| 2005/0118919 A1 | 6/2005 | Link et al. |
| 2006/0042020 A1 | 3/2006 | Salmon et al. |
| 2006/0093870 A1 | 5/2006 | Davis |
| 2006/0150339 A1 | 7/2006 | McGuire et al. |
| 2006/0194900 A1 | 8/2006 | Chow et al. |
| 2006/0228528 A1 | 10/2006 | Link et al. |
| 2006/0231487 A1 | 10/2006 | Bartley et al. |
| 2006/0277879 A1* | 12/2006 | Knowles ............ B01D 46/0005 55/497 |
| 2006/0286884 A1 | 12/2006 | Thioliere et al. |
| 2007/0023349 A1 | 2/2007 | Kylloenen et al. |
| 2007/0084786 A1 | 4/2007 | Smithies |
| 2007/0123130 A1* | 5/2007 | Manuel ................ B32B 5/12 442/381 |
| 2007/0163216 A1 | 7/2007 | Smasal et al. |
| 2007/0178788 A1* | 8/2007 | Link ................ B32B 27/12 428/920 |
| 2007/0207533 A1 | 9/2007 | Callahan |
| 2007/0245703 A1 | 10/2007 | Randinelli et al. |
| 2008/0022645 A1* | 1/2008 | Skirius ................ A47C 31/007 55/527 |
| 2008/0072753 A1 | 3/2008 | Lukens et al. |
| 2009/0030131 A1 | 1/2009 | Fushitani et al. |
| 2009/0194093 A1 | 8/2009 | Aviles |
| 2010/0071324 A1* | 3/2010 | Alexander ............ B01D 39/163 29/592 |
| 2010/0071327 A1* | 3/2010 | Alexander ............ B65D 88/741 156/60 |
| 2010/0319676 A1 | 12/2010 | Morton |
| 2011/0186504 A1 | 8/2011 | Rocklitz |
| 2012/0192534 A1 | 8/2012 | Lambertson |
| 2013/0007998 A1 | 1/2013 | Alexander et al. |
| 2013/0327218 A1 | 12/2013 | Izzi et al. |
| 2014/0250844 A1 | 9/2014 | Lambertson |
| 2014/0366496 A1 | 12/2014 | Salpietra |
| 2015/0128804 A1 | 5/2015 | Salpietra |
| 2018/0207569 A1* | 7/2018 | Salpietra ............ B01D 46/0005 |
| 2020/0277134 A1* | 9/2020 | Alexander ............ B01D 39/163 |
| 2021/0063021 A1* | 3/2021 | Salpietra ............ F24C 15/2035 |

FOREIGN PATENT DOCUMENTS

| | | |
|---|---|---|
| CN | 201235267 Y | 5/2009 |
| DE | 817302 | 10/1951 |
| DE | 8022263 | 2/1981 |
| DE | 8905395 | 6/1989 |
| DE | 29906295 | 8/1999 |
| DE | 10127678 | 1/2003 |
| DE | 60221829 | 5/2008 |
| EP | 1762655 | 3/2007 |
| EP | 1826493 | 8/2007 |
| EP | 1861524 | 12/2007 |
| GB | 572899 | 10/1945 |
| GB | 818943 A | 8/1959 |
| GB | 818948 A | 8/1959 |
| GB | 822175 | 10/1959 |

(56) References Cited

FOREIGN PATENT DOCUMENTS

| | | |
|---|---|---|
| GB | 1401231 | 7/1975 |
| GB | 2290727 | 1/1996 |
| JP | S61220711 | 10/1986 |
| JP | 03288506 | 12/1991 |
| JP | 09-234316 | 9/1997 |
| JP | 11108408 | 4/1999 |
| JP | 2001234902 | 8/2001 |
| JP | 2003-292688 | 10/2003 |
| JP | 2011-234902 | 11/2011 |
| JP | 2016526480 | 9/2016 |
| WO | WO98/45021 | 10/1998 |
| WO | WO2007/023777 | 3/2007 |
| WO | WO2007096731 | 8/2007 |
| WO | WO2007/140302 | 12/2007 |
| WO | WO2008/103736 | 8/2008 |
| WO | WO2016149356 | 9/2016 |

OTHER PUBLICATIONS

Invitation to Pay Additional Fees and, Where Applicable, Protest Fee; International Application No. PCT/US2009/057994, dated Feb. 19, 2010.
Notification of Transmittal of the International Search Report and the Written Opinion of the International Searching Authority, or the Declaration for International Application No. PCT/US2009/058186, dated Feb. 24, 2010.
Examination Report issued by the Intellectual Property Office of New Zealand, in Patent Application No. 591766, dated Mar. 27, 2012.
Notice for Reasons for Rejection in Japanese Application No. 2011-529178 dated Jun. 18, 2013.
Office Action of Japan Patent Office in Japanese Application No. 2011-529178 dated Mar. 4, 2014.
Notification of Transmittal of the International Search Report and the Written Opinion of the International Searching Authority, or the Declaration in International Application No. PCT/US2014/042381, dated Jun. 30, 2015.
Communication Pursuant to Article 94(3) EPC, Examination Report in EP Application No. 09 792 886.5-1605, dated Feb. 5, 2016.
Canadian Examiner Requisition in Canadian Application No. 2,737,789 dated Jun. 5, 2015.
Patent Examination Report No. 1, in Australian Application No. 2009296719, dated Jun. 1, 2015.
Canadian Examiner Requisition in Canadian Application No. 2,737,789 dated Feb. 26, 2016.
EP Annex Exam Report in Application No. 09 792 886.5, dated Dec. 16, 2016.
Intellectual Property India Examination Report in Indian Application No. 2710/DELNP/2011, dated Mar. 28, 2018.
European Patent Office Extended Search Report in EP Application No. 17190107.7-1009/3315184 dated May 7, 2018.
Canadian Examiner Requisition in Canadian Application No. 2,977,098 dated Jul. 16, 2018.
Communication Pursuant to Article 94(3) EPC, Examination Report in EP 17 190 107.7-1009 dated Feb. 25, 2019.
Canadian Examiner Requisition in Canadian Application No. 2,977,098, dated Mar. 5, 2019.
Communication Pursuant to Article 94(3) EPC, Examination Report in Application No. 14 737 436.7-1009, dated May 17, 2019.
PCT Notification of Transmittal of The International Search Report and the Written Opinion of the International Searching Authority, or the Declaration with attached International Search Report and Written Opinion of the International Searching Authority in International Application No. PCT/US2019/022388 dated May 27, 2019.
European Patent Office Examination Report in EP Application No. 17 190 107.7-1009 dated Sep. 26, 2019.
Office Action of Japan Patent Office for Japanese Patent Application No. 2018-209361 dated Sep. 17, 2019 (translated).
Canadian Examiner Requisition in Canadian Application No. 2,977,098 dated Oct. 16, 2019 (in English).
UAE Search Report and Examination Report in UAE Application No. UAE/P/1665/2015, dated Dec. 12, 2019.
European Extended Search Report in Application No. 19210173.1-1009 dated Dec. 18, 2019.
Chinese Office Action in CN Application No. 201710534659.9 dated Jan. 13, 2020 (not translated).
U.S. Patent and Trademark Office, Non-Final Office Action in U.S. Appl. No. 12/565,582 dated Mar. 11, 2011.
U.S. Patent and Trademark Office, Final Office Action in U.S. Appl. No. 12/565,582 dated Sep. 15, 2011.
U.S. Patent and Trademark Office, Advisory Action in U.S. Appl. No. 12/565,582 dated Nov. 21, 2011.
U.S. Patent and Trademark Office, Non-Final Office Action in U.S. Appl. No. 12/565,582 dated Jan. 15, 2013.
U.S. Patent and Trademark Office, Final Office Action in U.S. Appl. No. 12/565,582 dated Jul. 10, 2013.
U.S. Patent and Trademark Office, Advisory Action in U.S. Appl. No. 12/565,582 dated Oct. 22, 2013.
U.S. Patent and Trademark Office, Non-Final Office Action in U.S. Appl. No. 12/565,582 dated May 13, 2014.
U.S. Patent and Trademark Office, Non-Final Office Action in U.S. Appl. No. 12/565,582 dated Nov. 14, 2014.
U.S. Patent and Trademark Office, Final Office Action in U.S. Appl. No. 12/565,582 dated Mar. 25, 2015.
U.S. Patent and Trademark Office, Non-Final Office Action in U.S. Appl. No. 12/565,582 dated Dec. 22, 2015.
U.S. Patent and Trademark Office, Final Office Action in U.S. Appl. No. 12/565,582 dated Jul. 28, 2016.
U.S. Patent and Trademark Office, Non-Final Office Action in U.S. Appl. No. 12/565,592 dated Mar. 11, 2011.
U.S. Patent and Trademark Office, Final Office Action, in U.S. Appl. No. 12/565,592 dated Sep. 13, 2011.
U.S. Patent and Trademark Office, Advisory Action in U.S. Appl. No. 12/565,592 dated Nov. 25, 2011.
U.S. Patent and Trademark Office, Non-final Office Action in U.S. Appl. No. 12/565,592 dated Jan. 14, 2013.
U.S. Patent and Trademark Office, Final Office Action in U.S. Appl. No. 12/565,592 dated Jul. 1, 2013.
U.S. Patent and Trademark Office, Advisory Action in U.S. Appl. No. 12/565,592 dated Nov. 12, 2013.
U.S. Patent and Trademark Office, Notice of Allowance in U.S. Appl. No. 12/565,592 dated Apr. 9, 2014.
U.S. Patent and Trademark Office, Non-Final Office Action in U.S. Appl. No. 12/565,592 dated Nov. 14, 2014.
U.S. Patent and Trademark Office, Final Office Action in U.S. Appl. No. 12/565,592 dated Mar. 25, 2015.
U.S. Patent and Trademark Office, Advisory Action in U.S. Appl. No. 12/565,592 dated Sep. 4, 2015.
U.S. Patent and Trademark Office, Non-Final Office Action in U.S. Appl. No. 12/565,592 dated Nov. 17, 2017.
U.S. Patent and Trademark Office, Final Office Action in U.S. Appl. No. 12/565,592 dated May 9, 2018.
U.S. Patent and Trademark Office, Advisory Action in U.S. Appl. No. 12/565,592 dated Jul. 23, 2018.
U.S. Patent and Trademark Office, Non-Final Office Action in U.S. Appl. No. 14/182,080 dated Jul. 2, 2014.
U.S. Patent and Trademark Office, Final Office Action in U.S. Appl. No. 14/182,080 dated Feb. 20, 2015.
U.S. Patent and Trademark Office, Requirement for Restriction/Election in U.S. Appl. No. 14/304,765 dated Sep. 3, 2015.
U.S. Patent and Trademark Office, Non-Final Office Action in U.S. Appl. No. 14/304,765 dated Oct. 21, 2015.
U.S. Patent and Trademark Office, Non-Final Office Action in U.S. Appl. No. 15/005,282 dated Aug. 1, 2017.
U.S. Patent and Trademark Office, Final Office Action in U.S. Appl. No. 15/005,282 dated Apr. 24, 2018.
U.S. Patent and Trademark Office, Non-Final Office Action in U.S. Appl. No. 15/005,282 dated Oct. 9, 2018.
Canadian Examiner Requisition in Canadian Application No. 2,977,098, dated Jun. 9, 2020.

(56) References Cited

OTHER PUBLICATIONS

Communication Pursuant to Article 94(3) EPC, Examination Report in EP Application No. 17 190 107.7-1009 dated Jul. 15, 2020.
Communication Pursuant to Article 94(3) EPC, Examination Report in EP Application No. 17 190 107.7-1009 dated Dec. 22, 2020.
S. J. Russell, "Handbook of Nonwovens," Woodhead Publishing in Textiles, 2007.
Communication Pursuant to Article 94(3) EPC, Examination Report in EP Application No. 17 190 107.7-1009 dated May 28, 2021.
Communication Pursuant to Article 94(3) EPC, Examination Report in EP Application No. 17 190 107.7-1009 dated Oct. 7, 2021.
Mexico Office Action in Application No. MX/E/2021/072054 dated Nov. 5, 2021.
Notification of Transmittal of the International Search Report and the Written Opinion of the International Searching Authority, or the Declaration for International Application No. PCT/US2009/057994, dated Jul. 14, 2010.
European Patent Office Communication pursuant to Article 94(3) EPC, in Application No. 17 190 107.7-1009, dated Mar. 17, 2022.

\* cited by examiner

FLAME RESISTANT FILTER APPARATUS AND METHOD

RELATED APPLICATIONS

This application is a continuation-in-part of U.S. application Ser. No. 16/236,727, filed Dec. 31, 2018, entitled "Flame Resistant Viscose Filter Apparatus and Method," which is a continuation of, and claims the benefit of, U.S. application Ser. No. 12/565,592, filed Sep. 23, 2009, entitled "Flame Resistant Viscose Filter Apparatus and Method," now U.S. Pat. No. 10,167,137. U.S. application Ser. No. 12/565,592, now U.S. Pat. No. 10,167,137, claims the benefit of U.S. Provisional Application No. 61/099,688, filed Sep. 24, 2008, and is a continuation of, and therefore claims the benefit of, U.S. application Ser. No. 12/430,650 filed Apr. 27, 2009, now U.S. Pat. No. 8,277,530, entitled "Grease Removal Apparatus, Systems and Methods" which claims the benefit of U.S. Provisional Application No. 61/099,699, filed Sep. 24, 2008, the entire content of which is incorporated herein by reference.

TECHNICAL FIELD OF THE INVENTION

The teachings of the present disclosure relate generally to exhaust filtration in ventilation systems, and more particularly to a flame resistant filter apparatus and method.

BACKGROUND OF THE INVENTION

The exhaust units used in food preparation and commercial kitchens include devices such as air extractor hoods and air conditioning units. The traditional exhaust systems include filter elements that use a variety of metal or flame listed baffles, as identified in the various U.S. or State Codes, for the purpose of blocking flames from penetrating the exhaust system and diverting grease from building up in the ductwork of the exhaust system.

The exhausted air in the food preparation environment is typically laden with greasy vapor and unwanted odors and substances. The grease and unwanted substances should be trapped by the filters before passing through to the ducting to be released to the environment. In addition, the grease and others substances contaminate the hood and fan and these require constant cleaning to remove the grease. As the filters get quickly filled with grease they require regular cleaning. Moreover, the grease in the ducting constitutes a major fire hazard as ducting fires are a constant concern.

SUMMARY OF THE INVENTION

The present disclosure provides a flame resistant exhaust filter apparatus, system and method that substantially eliminates or reduces at least some of the disadvantages and problems associated with previous exhaust filtration system and methods.

In accordance with one embodiment of the present disclosure, a method of manufacturing a filter pad includes carding a plurality of fibers into a first fiber web, the plurality of fibers comprising at least one or more wool fibers uploaded with particles from a first flame resistant agent. The manufacturing method further includes forming a non-woven blanket comprising at least the first fiber web; and applying a bonding emulsion to the non-woven blanket.

In accordance with another embodiment of the present disclosure, a filter pad with a dry loft between approximately 0.15 and 0.5 inches includes at least a first fiber web comprising a plurality of oleophilic fibers, wherein the oleophilic fibers: have a linear density between approximately 2 and 9 denier; have a length between approximately 1 and 4 inches; and have been uploaded with flame resistant particles.

Technical advantages of particular embodiments of the present disclosure include efficiently removing or reducing grease particulates from grease-laden vapor or air emanating from kitchen equipment. Accordingly, baffle filters and connecting ductwork may remain cleaner for a longer period of time, thereby providing an effective fire barrier, since the fuel source (e.g., grease particulates) is partially or substantially removed from the airflow prior to reaching any baffle filters and/or ductwork.

Technical advantages of particular embodiments of the present disclosure also include the ability to easily remove and replace a grease-saturated filter assembly, eliminating the need for costly and time-consuming cleaning of traditional baffle or other non-disposable filters. Consequently, particular embodiments of the present invention provide a disposable and replaceable filter for grease-laden vapor and air emanating from kitchen equipment. Additionally, the filter assembly may be biodegradable, allowing for safe, ecologically-friendly, and cost-effective disposal of used filter assemblies.

Other technical advantages of particular embodiments of the present disclosure include reducing the likelihood of damaging fires caused by flames interacting with grease build-up in traditional filters. In particular embodiments, a fire-resistant or fire-retardant chemical may be applied to a filter assembly. Thus, the likelihood of flames or excessive heat buildup causing a conflagration in a filter assembly may be substantially reduced or eliminated altogether. Additionally, embodiments of the present disclosure may be formed from flame resistant viscose, which is extremely heat and flame resistant. Such heat and flame resistant properties may substantially reduce or eliminate damage to the filter assembly or surrounding vent hood in situations in which a filter assembly may come into contact with extreme heat, open flames, or grease flare-ups.

Other technical advantages of particular embodiments of the present disclosure include enhanced self-support of the filter assembly. In particular embodiments, the flame resistant viscose and wool blend is much stronger and more self-supporting than other wool-based filters. This provides particular embodiments of the present disclosure with the benefit of requiring less support in the filter supporting assembly in the ventilation hood. Moreover, the wool-flame resistant viscose blend is more structurally firm than other wool-based filters, and will lend itself to automated packing and processing more readily than primarily wool-based filters.

Other technical advantages of the present disclosure will be readily apparent to one skilled in the art from the following figures, description, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE INVENTION

Figure 1:
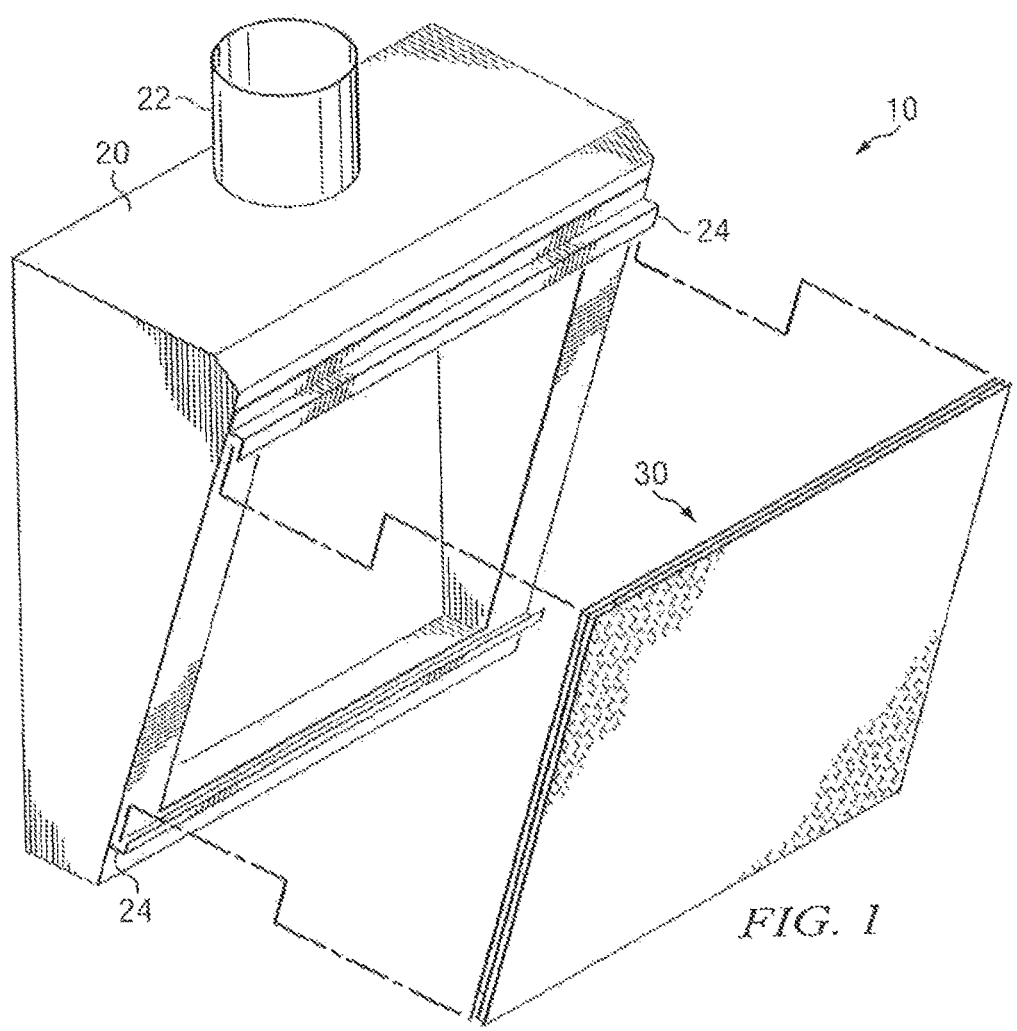
FIG. 1 illustrates an exhaust filtration system, including a vent hood and a filter assembly.

FIG. 1 illustrates a particular embodiment of an exhaust filtration system 10. Exhaust filtration system 10 may include vent hood 20 and filter assembly 30. To filter grease, vapor and other particulates arising from kitchen equipment, filter assembly 30 may be mounted in vent hood 20. In particular embodiments, filter assembly 30 may be formed of materials such that it is generally "self-supporting," meaning that it does not require metal filter support frames, frame covers or heat shields. Filter assembly 30 can be formed in a variety of ways using a variety of materials that may result in a filter assembly 30 that is either reusable or disposable. In such embodiments, filter assembly 30 may be easily mounted, as discussed further below, in vent hood 20 by simply sliding it into place on brackets or some other similar fastening or support system within vent hood 20.

Vent hood 20 may represent any ventilation equipment designed or configured to exhaust heat, odors, grease, vapor, grease-laden vapor, and/or other particulates away from kitchen equipment. For example, in particular embodiments, vent hood 20 may be positioned in proximity to a fryer, grill, griddle, or oven, whether in a home or commercial setting. In particular embodiments, vent hood 20 may be positioned above the relevant kitchen equipment, so that naturally rising heat and vapor passes through or is sucked into vent hood 20 and filter assembly 30. Mounting brackets 24 may also be provided as part of vent hood 20. For purposes of this disclosure, "mounting brackets" may refer to clips, brackets, grooves, clasps, and/or any other type of holding mechanism to hold or secure filter assembly 30 within or on a portion of vent hood 20. Mounting brackets 24 may be formed of practically any material that will support the weight of filter assembly 30 and hold filter assembly 30 in place within the exhaust hood. In accordance with a particular embodiment of the present disclosure, to meet various codes and regulations governing exhaust hoods, the mounting brackets may be comprised of stainless steel and/or another noncombustible material. Mounting brackets 24 may be designed to practically any shape to hold filter assembly 30 in place and maintain a sufficient seal within the vent hood 20 aperture. In particular embodiments of the present disclosure, the mounting brackets may be made of stainless steel and formed into the shape of "Z" or "U" to hold filter assembly 30 in place, and allow for simplified removal and/or replacement of filter assembly 30.

Vent hood 20 may additionally include one or more baffle filters (not shown in FIG. 1), which may be configured with a series of overlapping baffles. The overlapping baffles may force the grease-laden exhaust vapor to make several changes in direction within the grease filter. The grease is dismissed from the air stream by centrifugal force and accumulates within the baffle interior. In particular embodiments, filter assembly 30 may be positioned in front of one or more baffle filters, such that grease-laded vapor or exhaust air is first filtered by filter assembly 30 before passing through one or more baffle filters. In general, however, filter assembly 30 and one or more baffle filters may be disposed or positioned in any appropriate relative arrangement, including any adjacent, conjunctive or separated arrangement. Vent hood 20 may additionally include exhaust conduit 22, which may connect components of vent hood 20 to ductwork that transports filtered exhaust air to other portions of a ventilation system. In particular embodiments, the filtered air may be carried through exhaust conduit 22 to ductwork that ultimately transports the filtered exhaust air to the outside environment. In other particular embodiments, the filtered exhaust air may be carried through exhaust conduit 22 and released into the immediate interior kitchen environment. Particular embodiments of vent hood 20 may include one or more fan assemblies that create pressure to facilitate the movement of air and/or vapor through filter assembly 30 and through exhaust conduit 22.

Filter assembly 30 is positioned or disposed within or on vent hood 20, and filters heat, odors, grease, vapor, grease-laden vapor, and/or other particulates or contaminants emanating from kitchen equipment. As discussed further below with respect to FIG. 2, filter assembly 30 may be at least partially constructed of biodegradable wool fiber, fire resistant viscose and a bonding emulsion blend to which a fire retardant solution may be applied. Filter assembly 30 may be removably coupled to vent hood 20 by mounting brackets 24, or any other clips, brackets, grooves, clasps, or any other type of holding mechanism. Thus, as a first filter assembly 30 becomes partially or fully saturated with grease, vapor, and/or other particulates, the first filter assembly 30 may be loosened and removed from one or more holding mechanisms, and a second clean or unused filter assembly 30 may be removably coupled to vent hood 20 with the holding mechanism. Consequently, filter assembly 30 may be disposable and interchangeable with other filter assemblies 30. Moreover, a particular vent hood 20 may accommodate or support a plurality of filter assemblies 30. A plurality of filter assemblies 30 may be placed or disposed in vent hood 20 in any appropriate arrangement, including, but not limited to, side by side, separated, or "back to back," such that a given volume of air or grease-laden vapor flows through each filter assembly 30.

Figure 2:
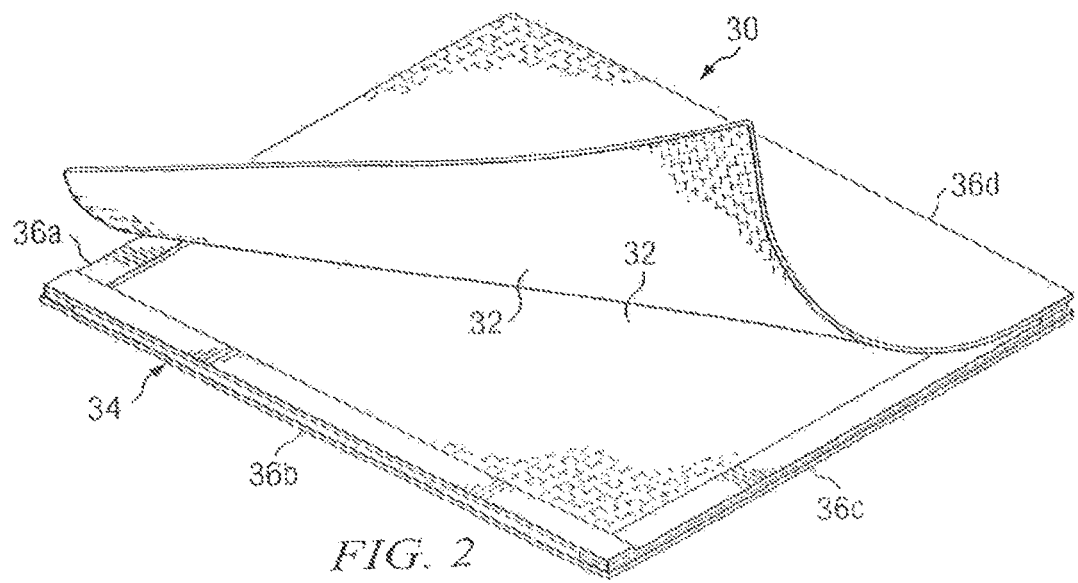
FIG. 2 illustrates the filter assembly of FIG. 1 in more detail, including aspects of an embodiment of the present disclosure.

FIG. 2 illustrates in greater detail filter assembly 30 as shown in FIG. 1. As noted above with respect to FIG. 1, filter assembly 30 may be positioned or disposed within or on vent hood 20, and filters heat, odors, grease, vapor, grease-laden vapor, and/or other particulates or contaminants emanating from kitchen equipment. To facilitate positioning within vent hood 20 in order to capture and/or remove grease or vapor from exhaust air, particular embodiments of filter assembly 30 may include filter pad 32 and support structure 34. In particular embodiments, filter pad 32 may facilitate the capture and removal of grease, grease-laden vapor, and other particulates from the air. For example, filter pad 32 may be formed from fibers that are capable of collecting and/or holding grease particulates from air that travels through the filter pad 32. Filter pad 32 may also be formed from fibers that are heat and flame resistant. For example, filter pad 32 may be formed from a blend of wool fibers and flame resistant (FR) viscose. Additionally, in particular embodiments, the filter pad 32 may be formed from wool, FR viscose, and/or other fibers bonded together with a bonding emulsion that may contain additional additives such as fire retardant, fire suppressant, anti-microbial, anti-bacterial, color dyes, etc. As shown in FIG. 2, filter assembly 30 may include two filter pads 32 couple to support structure 34. In general, however, filter assembly 30 may include any appropriate number of filter pads 32, depending on the operating conditions of exhaust filtration system 10.

Because wool is naturally oleophilic, wool fiber has the ability to at least partially capture and/or remove grease from grease-laden vapor or air emanating from kitchen equipment. Accordingly, at least a portion of or substantially all of the grease or other particulates are captured at filter assembly 30 by filter pad 32 before the remaining air passes through a baffle filter and/or exhaust conduit 22. Particular embodiments of filter assembly 32 may include fibers other than wool. Thus, filter assembly 30 may be manufactured using one or more (e.g., a blend) of various fibers. For example, at least three different types of fibers may be used: (i) natural fibers, (ii) synthetic fibers, and/or (iii) hybrid fibers. For the purposes of this disclosure, "natural" fibers generally refers to fibers that are derived from nature and include wool (e.g., sheep's wool or any other animal hair), cotton, linen, hemp, manila, flax, plant fibers, jute sisal, etc. For the purposes of this disclosure, "synthetic" fibers generally refers to fibers that are man-made, and include nylon, polyester, acrylic, polypropylene, polyethylene, polystyrene, flame resistant modified acrylic, etc. For the purposes of this disclosure, "hybrid" fibers generally refers to fibers that are derived from nature but materially modified by man, and include viscose, rayon, PLA, PLA flame resistant polymers, biodegradable flame resistant polymers, flame resistant rayon, synthetic fiber derived from a natural source, fibers that are derived from corn starch, etc. At least some of the above referenced fibers may also be used in a flame resistant form in which a flame resistant additive is impregnated into the fibers. Additionally, filter assembly 30 may be manufactured using any of the natural, synthetic, or hybrid fibers alone, or in combination with one or more other fibers.

In kitchens, some filters may be installed in exhaust hoods above various fat fryers, grills, griddles and ovens where excess heat and flame can occur. Unless stainless steel heat shields are used there is the possibility that concentrations of heat (e.g., from exhaust of an oven or steamer), will degrade the wool fibers and cause a hole to form in the filter. Similarly, flames will make holes in the filter if they come in direct contact with the filter which can happen above griddles and grills with a grease flare-up. This is a major drawback as a hole in the filter renders it ineffective and means it needs to be changed. Protein-based filters especially may degrade when exposed to heat.

Consequently, filter pad 32 may, in particular embodiments, be formed from a blend of wool and/or other fibers, and FR viscose. Flame resistant viscose is extremely heat and flame resistant and will only degrade under extreme conditions of heat and flame. Filter pad 32 may be formed using wool and FR viscose blended in any ratio. For example, in particular embodiments, filter pad 32 may be formed from a blend of 95% wool and 5% FR viscose. In other particular embodiments, filter 32 may be formed from a blend of 5% wool and as much as 95% FR viscose. Filter pad 32 may also be formed from FR viscose alone, i.e., 100% FR viscose. In general, however, filter pad 32 may be formed from any appropriate ratio of wool to FR viscose, depending on the particular operating characteristics or environment of exhaust filtration system 10.

Filter pad 32 may additionally be formed by applying a bonding emulsion to a wool-FR viscose blend. For example, the following describes blends that may be used in accordance with a particular embodiment of the present disclosure:

1. 50% wool and 50% 8-9 denier FR viscose bonded with a biodegradable acrylic bonding emulsion that has been treated with a fire resistant solution;
2. 100% 8-9 denier FR viscose bonded with a biodegradable acrylic bonding emulsion that has been treated with a fire resistant solution;
3. 50% wool/25% 8-9 denier FR viscose/25% 2 denier FR viscose bonded with a biodegradable acrylic bonding emulsion that has been treated with a fire resistant solution; or
4. 100% wool bonded with a biodegradable acrylic bonding emulsion that has been treated with a fire resistant solution. For purposes of this disclosure, "denier" is a unit of measurement of linear density of textile fiber mass, calculated as one gram per nine-thousand meters.

Additionally, filter pad 32 may be formed from a wool-FR viscose blend that is further blended with other fibers, either natural, synthetic or both, which can impart flame resistant or structural properties. Examples of such additional natural and synthetic fibers include, but are not limited to, rayon, fire resistant rayon, fire resistant modacrylic, polylactic acid fire resistant polymers, biodegradable fire resistant polymers, plant fibers or fire resistant natural fibers derived from plant fibers (i.e. jute, flax, hemp, sisal, cotton, and/or manila). Filter pad 32 may be formed using any of the natural, hybrid, or synthetic fibers described herein alone, or in combination with one or more of the other fibers. In particular embodiments, flame resistant rayon may be the only type of fiber used in the formation of filter pad 32. Additionally, the fibers may be blended with wool and/or viscose in any appropriate combination or ratio.

As noted above, filter pad 32 may be formed by applying a bonding emulsion to a wool-FR viscose blend. The bonding emulsion used in conjunction with wool and/or FR viscose fibers may be configured according to the particular environment in which the exhaust filtration system 10 is installed, or the needs of the overall ventilation system. In particular embodiments, the bonding emulsion may comprise a blend of one or more natural or synthetic bonding substances. For example, the bonding emulsion may comprise an acrylic resin and casein resin blend. The bonding emulsion may also comprise a starch and protein blend. The bonding emulsion may also comprise a protein and casein resin blend. The bonding emulsion may also comprise a casein and polylactic acid (PLA) blend. The proportion of wool fibers and FR viscose to bonding emulsion may vary depending on the particular bonding emulsion used, the particular ratio of wool to FR viscose, the environment in which exhaust filtration system 10 operates, and/or any other considerations, factors, or variables. In particular embodiments, filter pad 32 may include up to 90% scoured wool and 10% bonding emulsion. In general, the various acrylic resin, casein resin, starch, protein, and polylactic acid substances may be inter-mixed and blended with each other in any appropriate combination and in any appropriate proportions.

In particular embodiments, the bonding emulsion may be designed so that it will break down over time when the filter is disposed of after use (i.e., is biodegradable). One or more of the fibers, including, but not limited to wool fibers and FR viscose, which may be made from wood, may also be biodegradable. While this bonding solution may be made from acrylic co-polymers and casein, it may also be made with other natural occurring and biodegradable (or other)

binders which are also biodegradable, including, but not limited to, starch and protein adhesives. Synthetic bonding components which have biodegradable properties including, but not limited to, polylactic acid (PLA), may also be used. Hydrogen-bonding may also be used in the manufacture and/or assembly of filter assembly 30, since, in particular embodiments it may be used to bind certain cellulose non-woven materials. Thus, the filter assembly 30 may be designed to be fully biodegradable and, as such, can be easily disposed of while minimally affecting the environment.

Additionally, in particular embodiments, a flame retardant solution may be applied to the wool fibers, the wool-FR viscose blend, the bonding emulsion, or the wool-FR viscose and bonding emulsion blend, to provide resistance to flames, fire, or heat. While wool is naturally flame resistant, in a configuration in accordance with the teachings of this disclosure, wool fibers may be exposed to higher concentrations of oxygen from the air, making combustion a possibility in certain conditions. Thus, a flame retardant may be applied to further prevent or reduce combustion, charring, or other deleterious consequences of interactions with fire. For example, in embodiments of exhaust filtration system 10 in which vent hood 20 and filter assembly 30 are positioned over an open flame, or positioned in an area where flames may occur, the flame retardant solution may provide filter assembly 30 with more resistance to flames or fire than would be the case if a fire retardant solution were not applied to filter assembly 30. Flame resistant properties of filter assembly 30 may be particularly useful in embodiments of exhaust filtration system 10 associated with a grill, griddle, fryer and/or oven. Additionally, the filter may also act as a flame barrier to other components of vent hood 32, such as exhaust conduit 22 and associated ductwork. In particular embodiments, however, filter assembly may be formed without adding a flame retardant compound, depending on the flame resistance of the fiber blend used or other appropriate variables or conditions.

Support structure 34 is designed to add structure and rigidity to filter assembly 30. In particular embodiments, support structure 34 may include four sides 36 (top 36a, bottom 36b, left 36c and right 36d). In other particular embodiments, support structure 34 may have fewer or additional sides. In other particular embodiments, support structure 34 may be rounded or oblong to support a rounded or oblong filter assembly 30. Additionally, support structure 34 may be made of practically any material. For example, support structure 34 may be made of a natural, biodegradable material that is lightweight and flame-resistant. Support structure 32 could be made of practically any material that will pass any required regulatory codes. Support structure 34 may also include any number of horizontal, vertical and/or diagonal supports of practically any size or configuration. Functionally, it is beneficial for support structure 34 to add shape and structure to filter assembly 30 with relatively little added weight and/or very little added static pressure. Thus, structural support may be made of any light-weight, structurally sound biodegradable material. In particular embodiments, support structure 34 may represent a box frame disposed between one or more filter pads 32. In such embodiments, the particular filter pads 32 may be held together with a heat-resistant glue. Both sides of support structure 34 may be coated with a heat-resistant glue which results in the components being held firmly together when pressure is applied to the unit to compress filter assembly 30. In other embodiments, support structure 34 may represent a frame that surrounds one or more filter pads 32, which are held within one or more grooves or slots in sides 36a, 36b, 36c, and/or 36d, or are held between glued edges of support structure 34.

In accordance with particular embodiments of the present disclosure, filter assembly 30 may vary in weight from 50 grams/square meter to 500 grams/square meter ("gsm"). However, particular embodiments of filter assembly 30 may weigh from 150 gsm to 250 gsm. Other particular embodiments of filter assembly may weigh from 100 gsm to 450 gsm. Additionally, in particular embodiments of exhaust filtration system 10 in which two filter pads 32 are combined in the manufacture of filter assembly 30, each filter pad 32 may weigh between 50 gsm and 150 gsm each, resulting in a combined weight of between 100 gsm and 300 gsm. For purposes of this disclosure, grams/square meter may refer to a dry mass weight. Additionally, filter assembly 30 may have a loft of approximately 10 mm to 30 mm, depending on the loft of the type of wool and FR viscose used, as this imparts loft and resilience to compression as part of its natural characteristics. Additionally, in particular embodiments of exhaust filtration system 10 in which two filter pads 32 are combined in the manufacture of filter assembly 30, each filter pad 32 may have a loft of approximately 12 mm to 15 mm, thus producing a combined assembled loft of approximately between 24 mm to 30 mm. The volume of air flowing through filter assembly 30 contributes to the efficient and effective use of the filter. The wool imparts loft and openness to the structure which allows sufficient air to pass through during operation. Although the materials, substances, methods, processes, and solutions have been described herein in connection with operation in an exhaust filtration system, some or all of the materials, substances, methods, processes, and solutions may additionally provide benefits in connection with insulation. For example, FR viscose is extremely heat and flame resistant and will only degrade under extreme conditions of heat and flame. Thus, the wool-FR viscose and/or fire resistant solution blend may be utilized in flame resistant clothing for firemen, welders, military and other workers in severe heat or flame conditions. Additionally, a wool-FR viscose blend may provide benefits in insulating appliances, homes, or any other device or structure where it is desirable to provide heat or flame resistance. In such embodiments, the loft and/or densities of filter pad 32 may be substantially higher, because there may be no need for any airflow.

A particular method that may be used to manufacture filter assembly 30 in accordance with a particular embodiment of the present disclosure is now described. Scoured wool may be opened to enable easier processing. The scoured wool may then be blended with the FR viscose or similar fiber as a pre-blend, then transferred to be put through a non-woven carding machine which further opens and aligns the filter blend fibers. The card makes the fiber blend into a fiber web which is then layered using a cross lapping machine into a wool wadding. The lapping and carding helps to ensure the wool fibers are aligned correctly so that when the wool wadding is sprayed with binder, the final filter will have sufficient loft and height. In particular embodiments, the wool-FR viscose blend filter may be needle punched into a non-woven blanket. Other non-woven processes, such as needling, thermo bonding, air laid, spun bond and/or other non-woven technology could be used to form the wadding/blanket in other embodiments. The terms "wadding" and "blanket" are referred to interchangeably herein.

At this stage a bonding emulsion may be applied by spraying the top and the bottom of the wadding with a spray mix. The emulsion is applied in a diluted form to allow penetration through the wadding. As the thickness of the wadding and grams per square meter can vary, the amount of bonding emulsion will also vary, so that it matches what is required to sufficiently bond the filter blanket and impart the desired physical properties. A flame retardant compound or solution may also be applied at this stage. In particular embodiments, the flame retardant compound is mixed with the bonding emulsion to provide even and thorough penetration through the wadding. The flame retardant compound may be diluted with water in a 50%/50%, or any other appropriate ratio. In addition, the bonding emulsion may include an antimicrobial and antibacterial agent added to it as well as an approved dye to dye the filter to the desired color.

The bonding emulsion may comprise one or more of the following additives: FR agent(s) (such as Amperse FR-51 and tris(2,3-dibromopropyl) phosphate), dye, resin, and water. In embodiments comprising one or more FR agent(s), the bonding emulsion may comprise any suitable concentration of FR agent(s). In some embodiments, the concentration of FR agent(s) is between approximately (+/−15%) 0.1 kg/liter and 0.4 kg/liter. In other embodiments, the concentration of FR agent(s) is between approximately (+/−15%) 0.2 and 0.3 kg/liter. In particular embodiments, the concentration of FR agent(s) is between approximately (+/−15%) 0.2 kg/liter. The dye included in the bonding emulsion may be of any suitable color. In a preferred embodiment, the dye is black in color. Black may be the preferred dye color in order to create a bonding emulsion that is grey in color. Varying shades of grey may be achieved by adding more or less black dye to the bonding emulsion.

In particular embodiments, a vacuum positioned in proximity to the filter may provide unidirectional pressure to assist the bonding emulsion, flame retardant compound, antimicrobial agent and/or antibacterial agent in penetrating the wadding.

The spray bonded wadding may then be passed through an oven that has an ambient internal temperature of approximately between 280 and 305 degrees Fahrenheit to drive off the water and cure the bonding resins and/or flame retardant compound. In particular embodiments, a second application of flame retardant compound may be applied to the wadding. As with the first application, the flame retardant compound may be diluted with water and sprayed onto the wadding to allow penetration through the wadding. The flame retardant may be diluted in water in any appropriate ratio, including, but not limited to 50% flame retardant and 50% water. After an appropriate soaking period, the wadding may travel a second time through an oven that has an ambient internal temperature of approximately between 280 and 305 degrees Fahrenheit to again dry the water and cure the bonding resins and/or flame retardant compound.

The resultant wadding may then be rolled into rolls and allowed 24 hours to fully cure and the binder to be fully effective. During this time the wool or other constituent fibers may absorb moisture from the atmosphere.

The resultant wadding may then be made into rolls cut at specific widths. These rolls are then cut into the filter panels and press packed into packages of, for example, 24 filters. The resulting filter may be supplied in either rolls or cut panels depending on the installation requirements. The most common method would be to fix the wool filter into frame which may be installed above a ventilation hood. The frame assembly may also have a front cover to support the filter. In addition where there is excessive heat and flame a shield may be placed over the filter frame assembly.

Figure 3:
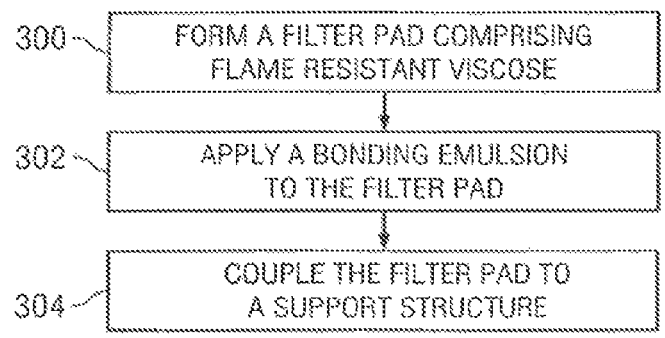
FIG. 3 is a flow chart illustrating a method of manufacturing a particular embodiment of the filter assembly of FIG. 2.

FIG. 3 is a flowchart illustrating a method of manufacturing the filter assembly 30 illustrated in FIG. 2. Operation, in the illustrated example, begins at step 300, in which a filter pad comprising flame resistant viscose is formed. As described above with respect to FIG. 2, flame resistant viscose is extremely heat and flame resistant and will only degrade under extreme conditions of heat and flame. In particular embodiments, flame resistant viscose may be blended with wool fibers to form the filter pad. Filter pad 32 may be formed using wool and FR viscose blended in any ratio. For example, in particular embodiments, filter pad 32 may be formed from a blend of 95% wool and 5% FR viscose. In other particular embodiments, filter 32 may be formed from a blend of 5% wool and as much as 95% FR viscose. Filter pad 32 may also be formed from FR viscose alone, i.e., 100% FR viscose. In general, however, filter pad 32 may be formed from any appropriate ratio of wool to FR viscose, depending on the particular operating characteristics or environment of exhaust filtration system 10. Additionally, at least three different types of fibers may be used in forming a filter pad: (i) natural fibers, (ii) synthetic fibers, and/or (iii) hybrid fibers. Filter pad 32 may be formed using any of the natural, synthetic, or hybrid fibers alone, or in combination with one or more other fibers.

At step 302 a bonding emulsion is applied to the filter pad. In particular embodiments, the bonding emulsion may comprise casein resin, acrylic resin, or a blend of one or more natural or synthetic bonding substances. For example, the bonding emulsion may comprise an acrylic resin and casein resin blend. The bonding emulsion may also comprise a starch and protein blend. The bonding emulsion may also comprise a protein and casein resin blend. The bonding emulsion may also comprise a casein and polylactic acid (PLA) blend. The proportion of wool fibers to bonding emulsion may vary depending on the particular bonding emulsion used, the environment in which exhaust filtration system 10 operates, and/or any other considerations, factors, or variables. In general, the various acrylic resin, casein resin, starch, protein, and polylactic acid substances may be inter-mixed and blended with each other in any appropriate combination and in any appropriate proportions, and applied to the fibers.

At step 304 the filter pad is coupled to a support structure. As described above with respect to FIG. 2, support structure 34 is designed to add structure and rigidity to filter assembly 30. Support structure 34 may comprise any appropriate lightweight, flame-resistant biodegradable material suitable to add structure to filter assembly 30. Additionally, support structure 34 may be shaped into any appropriate form suitable to perform the described functions, including rectangular, square, round, or any other multi-sided shape. Support structure 34 may also include any number of horizontal, vertical and/or diagonal supports of practically any size or configuration.

In particular embodiments, support structure 34 may represent a box frame disposed between one or more filter pads 32. In such embodiments, the particular filter pads 32 may be held together with a heat-resistant glue. Both sides of support structure 34 may be coated with a heat-resistant glue which results in the components being held firmly together when pressure is applied to the unit to compress filter assembly 30. In other embodiments, support structure 34 may represent a frame that surrounds one or more filter pads 32, which are held within one or more grooves or slots in sides 36a, 36b, 36c, and/or 36d, or are held between glued edges of support structure 34.

The steps illustrated in FIG. 3 may be combined, modified, or deleted where appropriate, and additional steps may also be added to those shown. Additionally, the steps may be performed in any suitable order without departing from the scope of the present disclosure.

Figure 4:
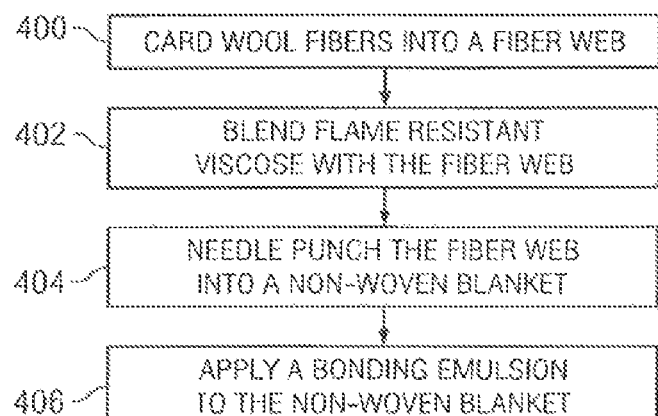
FIG. 4 is a flow chart illustrating a method of manufacture in accordance with a particular embodiment of the present disclosure.

FIG. 4 is a flowchart illustrating a particular method of manufacture in accordance with a particular embodiment of the present disclosure. Operation, in the illustrated example, begins at step 400, with wool fibers being carded into a fiber web. As discussed above, scoured wool may be opened to enable easier processing, then put through a non-woven carding machine which further opens and aligns the wool fibers. The card makes the wool into wool web which is then layered using a cross lapping machine into a wool wadding. The lapping and carding is helpful to ensure the wool fibers are aligned correctly so that when the wool wadding is sprayed with binder that the final filter will have sufficient loft and height.

At step 402, flame resistant viscose is blended with the fiber web. In particular embodiments, flame resistant viscose may be blended with wool or other fiber as a pre-blend, then transferred to be put through a non-woven carding machine which further opens and aligns the filter blend fibers. In particular embodiments, flame resistant viscose may be carded concurrently, so that the separate fibers are blended together.

In step 404, the fiber web is needle punched into a non-woven blanket. Other non-woven processes, such as needling, thermo bonding, air laid, spun bond and/or other non-woven technology could be used to form the wadding/blanket in other embodiments.

In step 406, a bonding emulsion is applied to the fiber web. In particular embodiments, the top and the bottom of the fiber web may be sprayed with a blend of bonding emulsion and flame retardant. In particular embodiments, the flame retardant compound is mixed with the bonding emulsion to provide even and thorough penetration through the wadding. The flame retardant compound may be diluted with water in a 50%/50%, or any other appropriate ratio. In particular embodiments, the bonding emulsion may comprise casein resin. The bonding emulsion may also comprise, alone or in combination, acrylic resin, starch and protein, protein and/or polylactic acid. Additionally, the bonding emulsion or flame retardant compound may be applied in a diluted form to allow penetration through the wadding. As the thickness of the wadding and grams per square meter can vary the amount of bonding emulsion will also vary, so that it matches what is required to sufficiently bond the filter blanket and impart the desired physical properties. In addition, the bonding emulsion may include an antimicrobial and antibacterial agent added to it as well as an approved dye to dye the filter to the desired color. In particular embodiments, a vacuum positioned in proximity to the filter may provide unidirectional pressure to assist the bonding emulsion, flame retardant compound, antimicrobial agent and/or antibacterial agent in penetrating the wadding. The spray bonded wadding may then be passed through an oven that has an internal ambient temperature of approximately between 280 and 305 degrees Fahrenheit to drive off the water and cure the bonding resins. In particular embodiments, an additional application of flame resistant compound may be applied subsequent to the filter pad passing through an oven. In such embodiments, the filter pad may then travel a second time through an oven that has an internal ambient temperature of approximately between 280 and 305 degrees Fahrenheit.

The steps illustrated in FIG. 4 may be combined, modified, or deleted where appropriate, and additional steps may also be added to those shown. Additionally, the steps may be performed in any suitable order without departing from the scope of the present disclosure.

The present disclosure is generally directed to a removable and/or disposable filter assembly (and the components thereof) that is placed between the cooking surface and the baffle filters disposed within a vent hood described herein, to capture grease and/or other particulates from grease laden vapors prior to entry into, or "upstream" from the baffle filters described herein.

Although this disclosure details various filter pad embodiments above comprising blends of wool and/or FR viscose, this disclosure recognizes that filter pads 32 comprising other materials may have the same, similar or better fire characteristics. For example, filter pad 32 may comprise FR wool fibers exclusively or in combination with other materials such as those discussed above.

As discussed above, one of the drawbacks to using wool fibers in applications where excess heat and flame can occur is the possibility of fiber degradation upon exposure to certain concentrations of heat. This disclosure recognizes reducing the risk of wool fiber degradation by improving the flame resistant properties of the wool fibers themselves. In some embodiments, the flame resistant properties of wool fibers are improved by uploading the fibers with one or more FR additives to create FR wool fibers.

FR wool fibers may be prepared using a process similar to that used to prepare FR viscose fibers. In some embodiments, uploading the wool with FR additive(s) comprises submerging the wool into a bath comprising a solute and an FR agent(s) such as a phosphate salt, a halogen salt, zirconium salt and/or a titanium salt. The bath may comprise any concentration of FR agent(s), however, this disclosure recognizes using a concentration sufficient to impart at least the fire resistant characteristics of FR viscose. In some embodiments, FR wool fibers include between approximately 1% and 12% deposition of an FR agent(s).

Once impregnated with FR agent(s), the wool is thereafter rinsed of the residual agent and subsequently dried. As one of ordinary skill in the art will recognize, the wool may be carded into a fiber web prior to or after being uploaded with FR agent(s). Such fiber web may be processed using scoured or unscoured wool. Although this disclosure describes a particular manner of uploading FR particles into a material, this disclosure recognizes that other suitable methods of uploading materials exist and this disclosure extends to those additional methods as well. As will be recognized by one of ordinary skill in the art, additional fire and flame resistant properties may be imparted to the FR wool fibers via subsequent application of an FR agent (e.g., by spraying with a bonding emulsion comprising an FR agent).

The FR wool fibers included in filter pad 32 may have the same or different linear density as the wool and FR viscose fibers discussed above. For the avoidance of doubt, this disclosure contemplates that one or more fibers comprising filter pad 32 (e.g., wool, FR wool, FR viscose) has a linear density between approximately (+/−15%) between 2 and 9 denier. In some embodiments, one or more fibers comprising filter pad 32 are provided within a narrower linear density range of approximately (+/−15%) 5-9 denier. In particular embodiments, the linear density of one or more fibers comprising filter pad 32 may be approximately (+/−15%) 8.5 denier. In some embodiments, one or more fibers comprising filter pad 32 (e.g., wool, FR wool, FR viscose) has a length between approximately (+/−15%) 1 to 4 inches. In some embodiments, one or more fibers comprising filter pad 32 are provided within a narrower length range of approximately (+/−15%) 2.5 to 3.5 inches. This disclosure further contemplates that FR wool may be manufactured from scoured or unscoured wool having a diameter between approximately (+/−15%) 25 to 45 microns.

1. FR wool fibers are particularly attractive for use in filter pads 32 given that FR wool fibers have better heat and flame resistant properties than natural wool and because FR wool fibers retain their inherent ability to absorb oils, such as grease. Accordingly, this disclosure recognizes manufacturing filter pad 32 using FR wool fibers alone or in combination with other types of fibers. The following describes particular embodiments of filter pads 32 having various fiber compositions particularly suitable for applications above kitchen equipment where excess heat and flame can occur: 100% FR wool;
2. 50% FR wool/50% FR viscose;
3. 50% FR wool/50% wool;
4. 50% FR wool/25% wool/25% FR viscose;
5. 70% FR wool/15% viscose/15% FR viscose; and
6. 50% wool/25% FR wool/25% FR viscose.

The percentages referenced herein with respect to fiber composition of filter pads 32 are approximations (+/−10%) and may refer to either fiber percentage by weight or volume. For example, the fourth enumerated embodiment describes a filter pad 32 comprising either (1) approximately 50% FR wool by weight, approximately 25% wool by weight, and approximately 25% FR viscose by weight; or (2) approximately 50% FR wool by volume, approximately 25% wool by volume, and approximately 25% FR viscose by volume. Accordingly, in the first scenario, if the total weight of fibers in filter pad 32 is 100 grams, the 100 grams would consist of approximately 50 grams of FR wool fibers, approximately 25 grams of wool fibers, and approximately 25 grams of FR viscose fibers. The by-volume embodiment can be calculated similarly using appropriate volume units. In general, however, filter pad 32 may be formed from any appropriate ratio of fibers, including FR wool fibers, depending on the particular operating characteristics or environment of exhaust filtration system 10.

Figure 5:
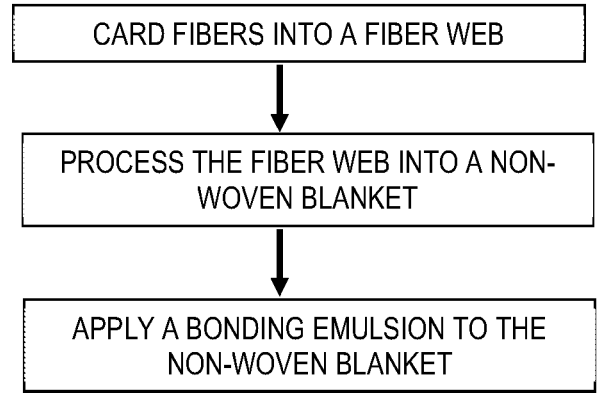
FIG. 5 is a flow chart illustrating a method of manufacture in accordance with a particular embodiment of the present disclosure.

A method of manufacturing filter pad 32 is illustrated in FIG. 5. The method begins at a step 610 wherein a plurality of fibers are carded into a first fiber web. The plurality of fibers may be comprise one or more of the following fibers: natural fibers, synthetic fibers, and hybrid fibers. In some embodiments, the plurality of fibers comprises one or more of wool fibers, FR wool fibers, viscose fibers, and FR viscose fibers. The plurality of fibers may, in some embodiments, be carded using a non-woven carding machine configured to open and align the fibers. The plurality of fibers being carded in step 510 may include any desirable combination of different types of fibers. For example, the plurality of fibers being carded in step 510 may include at least 50% FR wool fibers and the remaining percentage including fibers selected from the group consisting of: wool fibers, viscose fibers, and FR viscose fibers. As another example, the plurality of fibers being carded in step 510 may include less than 50% FR wool fibers, with the remaining percentage including fibers selected from the group consisting of: wool fibers, viscose fibers, and FR viscose fibers. As yet another example, the plurality of fibers being carded in step 510 may include at least 50% FR viscose fibers, with the remaining percentage including fibers selected from the group consisting of: wool fibers, viscose fibers, and FR wool fibers. As yet another example, the plurality of fibers being carded in step 510 may include less than 50% FR viscose fibers, with the remaining percentage including fibers selected from the group consisting of: wool fibers, viscose fibers, and FR wool fibers. Upon carding the plurality of fibers into a fiber web, the method 500 may proceed to a step 520.

At step 520, the fiber web constructed at step 510 is processed into a non-woven blanket. The non-woven blanket may be formed using any suitable non-woven process such as needle-punching, needling, thermo bonding, air laid, and spun bond technologies. The non-woven blanket may, in some embodiments, comprise fiber webs in addition to the fiber web constructed at step 510. In some embodiments, the non-woven blanket comprises the fiber web constructed at step 510 and one or more additional fiber webs which are layered before being processed into a non-woven blanket. As will be recognized by a person of ordinary skill in the art, such layering may be performed using a cross lapping machine.

At step 530, a bonding emulsion is applied to the non-woven blanket formed at step 520. The bonding emulsion may comprise one or more of the following: FR agent(s), dye, resin, and water. As one of ordinary skill in the art will recognize, creating a bonding emulsion comprising an FR agent will improve the ability of the fire and heat properties of the non-woven blanket.

The method 500 may include one or more additional steps that occur before, between, or after the steps illustrated in FIG. 5. For example, step 510 may be preceded by one or more steps involving the pre-blending or preparation of fibers (e.g., scouring wool, uploading wool or viscose with FR particles). As another example, step 530 may be succeeded by one or more additional steps (e.g., a vacuuming step wherein a vacuum is applied to one side of the non-woven blanket to facilitate penetration of the bonding emulsion through the non-woven blanket; one or more heating steps wherein the non-woven blanket is passed through an oven to drive off water and cure the bonding resins and/or FR additive from the bonding emulsion).

Filter pad 32 may comprise one or more types of fibers (e.g., wool, FR wool, viscose, FR viscose) that can be blended in numerous ways. For example, fibers of two or more types can be combined as a pre-blend which is in turn carded into a fiber web. As another example, fibers of a first type may be added to a fiber web comprising fibers of a second type. This disclosure further recognizes that a filter pad 32 may comprise a blend of fibers by incorporating one or more layers of fiber web of different types of fibers. For example, filter pad 32 may comprise two or more layers, each layer being a fiber web comprising a single type of fibers. In one embodiment, filter pad 32 includes first fiber web comprising a first type of fibers (e.g., FR wool fibers) and a second fiber web comprising a second type of fibers (e.g., FR viscose fibers). The first and second fiber webs are then layered and processed into a non-woven blanket and optionally sprayed with a bonding emulsion.

Manufacturing filter pad 32 using this layering method may have certain recognizable benefits. As one example, the efficiency of a filter pad 32 may be maximized based on the installation of such filter pad 32 within vent hood 20. This may be the case, for example, if filter pad 32 comprises two external fiber web layers having differing heat and flame characteristics. In one embodiment, filter pad 32 includes a first external layer comprising a wool fiber web and a second external layer comprising an FR wool fiber web. When installing such filter pad 32 within vent hood 20 over a low-heat/low-flame appliance, efficiency benefits are realized by positioning filter pad 32 such that the first external layer the wool fiber web—is upstream the second external layer. The opposite is also true. Efficiency benefits may be realized by positioning filter pad 32 such that second external layer—the FR wool fiber web—is upstream the first external layer when installing filter pad 32 in vent hood 20 above a high-heat/high-flame appliance. Although the example filter pad 32 described in this paragraph includes external layers comprising wool and FR wool, respectively, this disclosure recognizes that external layers may be any suitable external fiber web layers such as viscose, FR viscose, or even fiber webs comprising two or more fiber types (e.g., a fiber web comprising wool and FR viscose). Additionally, for the avoidance of doubt, this disclosure recognizes that a filter pad 32 manufactured using the layering method may include external layers comprising the same fiber type (e.g., both sides comprising FR wool fiber webs). Filter pad 32 may also include one or more internal layers comprising fiber webs carded from any suitable fiber type(s).

In some embodiments, the opposing sides of a layered filter pad 32 differ in color such that a user can easily determine which side should be positioned upstream the other when installed within vent hood 20. Using the example provided above, first external wool layer of filter pad 32 may be light grey in color and second external FR wool layer of filter pad 32 may be dark grey in color. A user may determine to dispose filter pad 32 within vent hood 20 one way or another (e.g., light grey side upstream dark grey side; dark grey side upstream light grey side) based on the appliance filter pad 32 is positioned above. In some embodiments, the fiber web layers differ in color because they have been died (or not died as the case may be). As disclosed above, a dye may be added to the bonding emulsion which may be optionally applied to a non-woven blanket.

Figure 6:
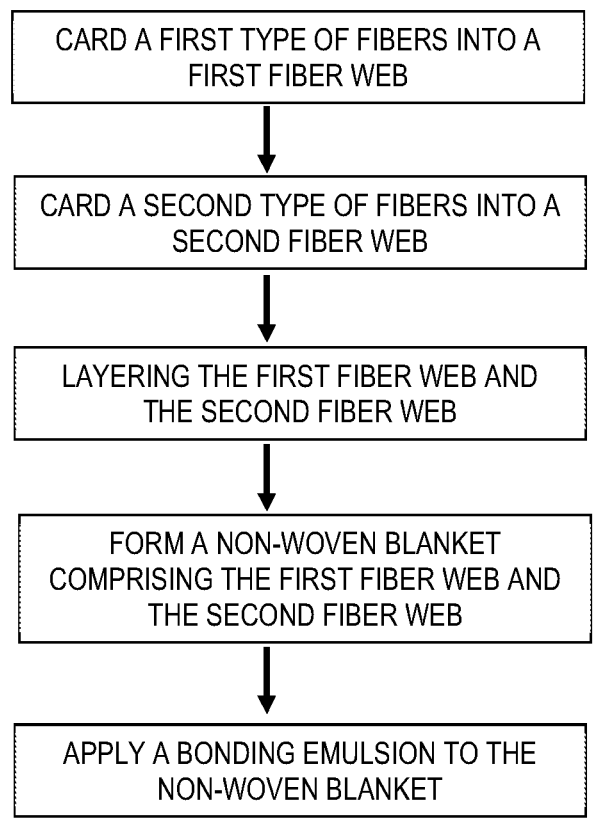
FIG. 6 is a flow chart illustrating a method of manufacture in accordance with a particular embodiment of the present disclosure.

FIG. 6 is a flowchart illustrating the layering method 500 described above. As discussed above, a filter pad 32 may be manufactured using such layering method. The method begins at a step 610 wherein a first type of fibers are carded into a first fiber web. The first type of fibers may be selected from the group consisting of: natural fibers, synthetic fibers, and hybrid fibers. In some embodiments, the first type of fibers comprises one of: wool fibers, FR wool fibers, viscose fibers, and FR viscose fibers. The first type of fibers may, in some embodiments, be carded using a non-woven carding machine configured to open and align the fibers.

At step 620, a second type of fibers are carded into a first fiber web. The second type of fibers may be selected from the group consisting of: natural fibers, synthetic fibers, and hybrid fibers. In some embodiments, the second type of fibers comprises one of: wool fibers, FR wool fibers, viscose fibers, and FR viscose fibers. The second type of fibers may, in some embodiments, be carded using a non-woven carding machine configured to open and align the fibers. In some embodiments, the first type of fibers is different than the second type of fibers. As one example, the first type of fibers may be FR wool fibers and the second type of fibers may be FR viscose fibers. As another example, the first type of fibers may be wool fibers and the second type of fibers may be FR viscose fibers. As yet another example, the first type of fibers may be FR wool fibers and the second type of fibers may be wool fibers. Although FIG. 6 depicts step 620 occurring subsequent to step 610, these steps may be performed concurrently.

At step 630, the first fiber web and the second fiber web are layered such that one fiber web is positioned atop the other fiber web. In some embodiments, the first fiber web and second fiber web are positioned in direct contact with each other. In other embodiments, one or more intervening fiber webs (comprising any desirable fiber composition) are sandwiched between the first fiber web and the second fiber web. In some embodiments, step 630 is performed using a cross lapping machine.

At step 640, a non-woven blanket comprising the first fiber web and the second fiber web is formed. The non-woven blanket may be formed using any suitable non-woven process such as needle-punching, needling, thermo bonding, air laid, and spun bond technologies. The non-woven blanket may, in some embodiments, comprise fiber webs in addition to the first fiber web and second fiber web.

At step 650, a bonding emulsion is applied to the non-woven blanket formed at step 640. The bonding emulsion may comprise one or more of the following: FR agent(s), dye, resin, and water. As one of ordinary skill in the art will recognize, creating a bonding emulsion comprising an FR agent will improve the ability of the fire and heat properties of the non-woven blanket. In some embodiments, bonding emulsion including dye is only applied to one side of the non-woven blanket. In other embodiments, bonding emulsion without dye is applied to both sides of the non-woven blanket. In certain other embodiments, one side of the non-woven blanket is dyed (e.g., by applying a dye spray) such that it differs in color from the opposing side.

The method 600 may include one or more additional steps that occur before, between, or after the steps illustrated in FIG. 6. For example, step 610 may be preceded by one or more steps involving the preparation of fibers (e.g., scouring wool, uploading wool or viscose with FR particles). As another example, carding of one or more additional fiber webs may be necessary between steps 620 and 630. The one or more additional fiber webs may comprise fibers of a single type or fibers of two or more types. As yet another example, step 650 may be succeeded by one or more additional steps (e.g., a vacuuming step wherein a vacuum is applied to one side of the non-woven blanket to facilitate penetration of the bonding emulsion through the non-woven blanket; one or more heating steps wherein the non-woven blanket is passed through an oven to drive off water and cure the bonding resins and/or FR additive from the bonding emulsion).

The dry weight of a single, finished filter pad 32 may vary depending on various factors that will be recognized by one of ordinary skill. For example, the dry weight of a single filter pad 32 may vary depending on the fiber composition of filter pad 32 and the number of layers of fiber webbing comprising filter pad 32. In some embodiments, a single, finished filter pad 32 may have a dry weight of approximately (+/−15%) 200 to 240 grams per square meter. As used herein, a "finished" filter pad refers to a product ready for installation within vent hood 20. Such filter pad has undergone any necessary fiber carding, fiber blending, needle-punching (or other similar process to form a non-woven blanket), and/or emulsion application. The loft of a finished filter pad may be between approximately (+/−15%) 0.15 and 0.5 inches. In certain preferred embodiments, the loft of a finished filter pad is between approximately (+/−15%) 0.25 and 0.33 inches. Finished filter pad 32 may be used in conjunction with any suitable hardware such as the filter assembly described in U.S. application Ser. No. 15/927,245.

Although an embodiment of the disclosure has been described using specific terms, such description is for illustrative purposes only. The words used are words of description rather than of limitation. It is to be understood that numerous changes, substitutions, variations, alterations, transformations, and modifications may be made by those of ordinary skill in the art without departing from the spirit and scope of the present disclosure, which is set forth in the following claims. Therefore, the spirit and scope of the appended claims should not be limited to the description of the embodiments disclosed therein.

What is claimed is:

1. A method of manufacturing a filter pad, the manufacturing method comprising:
uploading at least one or more wool fibers with particles from a first flame resistant agent by impregnating the at least one or more wool fibers with at least the first flame resistant agent and rinsing the at least one or more impregnated wool fibers;
carding a plurality of fibers into a first fiber web, wherein the plurality of fibers comprise at least the one or more uploaded wool fibers;
forming a non-woven blanket comprising at least the first fiber web, wherein each of the plurality of fibers of the non-woven blanket have a linear density between 1.7 and 10.35 denier; and
applying a bonding emulsion to the non-woven blanket.

2. The manufacturing method of claim 1, wherein the plurality of fibers further comprise at least one from a group consisting of:
wool fibers not uploaded with particles from the first flame resistant agent;
viscose fibers; and
viscose fibers uploaded with particles from a second flame resistant agent.

3. The manufacturing method of claim 1, wherein the non-woven blanket further comprises one or more additional fiber webs.

4. The manufacturing method of claim 1, further comprising:
creating a second fiber web comprising at least one from a group consisting of:
wool fibers not uploaded with particles from the first flame resistant agent;
wool fibers uploaded with particles from the first flame resistant agent;
viscose fibers; and
viscose fibers uploaded with particles from a second flame resistant agent.

5. The manufacturing method of claim 4, further comprising:
layering the first fiber web and the second fiber web.

6. The manufacturing method of claim 1, wherein the non-woven blanket is formed by using a non-woven technique selected from the group consisting of:
needle-punching;
needling;
thermo bonding,
air laid; and
spun bond.

7. The manufacturing method of claim 1, wherein the bonding emulsion comprises at least one from a group consisting of:
a resin;
water;
a dye; and
a flame retardant additive.

8. The manufacturing method of claim 7, wherein the resin comprises at least one from a group consisting of casein and acrylic.

9. The manufacturing method of claim 1, further comprising:
applying a vacuum to one side of the non-woven blanket to facilitate penetration of the bonding emulsion through the non-woven blanket.

10. The manufacturing method of claim 1, further comprising:
passing the non-woven blanket through an oven.

* * * * *